S. G. Sutton.
Road Scraper.
Nº 3,604.        Patented May 30, 1844.
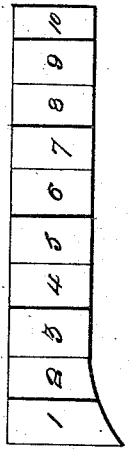
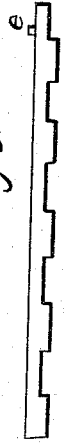
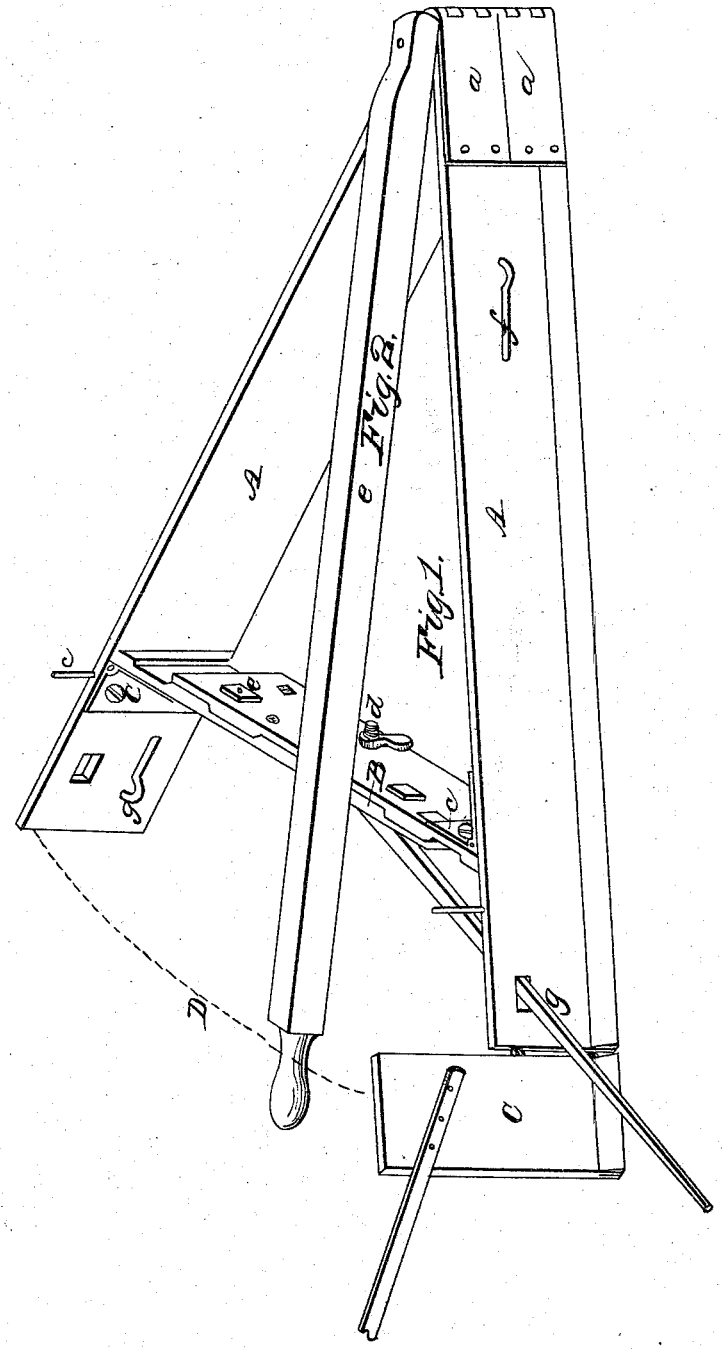

UNITED STATES PATENT OFFICE.

SAMUEL G. SUTTON, OF YORKSHIRE, NEW YORK.

SCRAPER FOR REPAIRING AND MAKING ROADS, &c.

Specification of Letters Patent No. 3,604, dated May 30, 1844.

*To all whom it may concern:*

Be it known that I, SAMUEL G. SUTTON, of Yorkshire, in the county of Cattaraugus and State of New York, have invented a new and useful Improvement in Triangular Scrapers for Making and Repairing Turnpikes and Common Roads; and I do hereby declare that the following is a full, clear, and exact description of the construction and operation of the same, reference being had to the annexed drawings, making a part of this specification, in which—

Figure 1 is a perspective view; Fig. 2, a representation of the weight; Fig. 3, a vertical view of one half of brace; and Fig. 4, a side view of the same.

The nature of my invention consists in constructing a triangular scraper in such a manner, and with such appendages, that it will carry the earth in the direction in which the scraper is drawn, or, remove it to the right or left, at the option of the person who manages it, and its application to the purposes of making and repairing turnpikes and common roads.

To enable others skilled in the art to make and use my invention, I will proceed to describe its construction and operation.

It consists of two sides, one brace, one weight, one gate, one gate handle, and one tiller constructed and ironed as hereinafter described.

The sides as shown at A A Fig. 1 in accompanying drawings are about ten feet long, about twenty inches wide and about two inches thick. The are connected together at one end by hinges (*a a*) in such a manner that the other ends may be brought within a few inches of each other, and expand to any convenient distance.

The brace (B) consists of two parts each about four feet long, about two inches thick, and about nineteen inches wide at one end, and about one foot at the other. The wide ends are fastened to the sides about two feet from the hind end, by buts or hinges (*b, b,*) in such a manner that one part may swing forward and the other backward, so that the scraper may be folded up in a small compass, for the convenience of transportation. In making the brace I divide each part into equal parts of about five inches each, beginning at the wide end. Nos. 2, 4, 6, 8, and 10 I cut out in the fashion of gains about one third of the thickness of that part of the brace Fig. 4 so that the two parts lock together and form one brace. The two parts are fastened together by screws and nuts so constructed that they may easily be turned by hand.

The weight (C and Fig. 2) is about ten feet long, and about seven inches square and placed on the top of the scraper. The fore end is kept in place by a pin which passes through it and is made fast in one of the sides near the fore end, which serves as a pivot, so that the other end may be removed from side to side at pleasure and is prevented from falling off by a pin (*e*) inserted in the side near the hind end. The gate (E) is about two feet nine inches long, about fifteen inches wide, and one and one half inches thick. It is attached to the hind end of the scraper by hooks and hinges and is used on each side as occasion may require. The gate handle (F) is about five feet long, and about three and a half inches square at one end, the other end is smaller and made round. The large end has a slit of the width and thickness of the gate into which the upper end of the gate is inserted and made fast by rivets or otherwise. The small end of the handle inclines a little upward.

The tiller (G) is about seven feet long, and near the lower end is about two and one half inches wide and about two inches thick, the other end is smaller and made round. The tiller passes through the side about one foot back of the brace and about three inches from the upper edge. The lower end is supported by a staple (*d*) in the center of and near the lower edge of the brace. Another staple (*e*) is inserted near the end of the brace, to support the tiller when the scraper is expanded. On the outer lower edge of each side is a plate of iron or steel, about four inches wide and about half an inch thick, the upper edge is sunk its thickness in to the wood which causes the lower edge to project a little outward. The lower edge is made sharp, and extends a little below the wood. On each side of the scraper, about two feet from the fore end and about six inches from the top, is a staple (*f*) by which the scraper is drawn when making roads, and two other staples (*g*) are inserted near the hind end and the inner sides by which the scraper is drawn when smoothing roads.

*Manner of using to make a road when the ground is tolerably level.*—I plow two furrows each side of the center of the road, leaving about ten feet in the center unplowed, turning the furrows inward I then place one side of the scraper in the last furrow, place the weight on the same side, I hitch my team to the staple on the side next to the center of the road, and place the tiller and the gate on the same side. I place a man at the tiller and drive the team lengthwise of the road, so that one side of the scraper will follow the last furrow. I go through on one side and back on the other. By this operation the four furrows are removed to the center of the road. I then repeat the operation until the road is made of sufficient width. I then plow one furrow each side in the same place of the last, for a ditch, and go another bout with the scraper. The man at the tiller assists in guiding the scraper, regulates its depth, and raises or lowers the tiller in such a manner as to give the road its proper shape. If the scraper inclines to go too deep the tiller should be raised and lowered a few times in quick succession which raises the point. If the surface of the ground is uneven the tillersman reaches the handle of the gate when coming to a rise or ridge and swings it round so as to carry the earth forward to a low place where it is needed. When I have made the road as wide is I wish to I expand the scraper to eight or nine feet by lengthening the brace, and scrape one or two bouts as before, which smooths the sides of the road. I then take off the weight, or, place it on the center, and draw the scraper the wide end forward on the center of the road, which makes the road smooth and fit for use.

The strength of team required in a great measure depends on the amount of work to be performed in a given time. I generally use four oxen or horses. When I have sufficient team at my command, I carry on the process of plowing and scraping at one and the same time.

To make a side hill road, I plow and scrape one side, once through as above described. After plowing one or two furrows more, I change sides of the scraper by shifting the chain, the weight, the tiller, and the gate, to the opposite sides, and drive back, by which I scrape both ways, and remove the earth down hill at each operation, and continue to do so until the road is finished.

To make a road up and down a hill, I plow as above described, and commencing at the top, scrape down on one side, then by the most convenient method, return the scraper to the top of the hill, and again scrape down on either side as the situation may require, and continue the operation 'til the road is completed.

During all these operations I contract or, expand the scraper, use or omit the gate as circumstance may require.

The scraper above described is sufficient to make a road twenty-five feet wide. In making roads of a greater width I use a scraper constructed on the same plan but of greater dimensions, in proportion to the width of the road.

What I claim as my invention and desire to secure by Letters Patent is—

1. Uniting the two sides of the scraper with a hinged joint at one end, and clamp brace pieces at the other, that the two sides may be separated or brought nearer together for the purpose and in the manner described.

2. I also claim the gate in combination with the scraper for the purpose and in the manner described.

SAML. G. SUTTON.

Witnesses:
GEORGE GRAHAM,
ART. SPRING.